United States Patent [19]

Feller

[11] Patent Number: 4,664,043
[45] Date of Patent: May 12, 1987

[54] DROP PLANTER

[75] Inventor: Marc E. Feller, Istres, France

[73] Assignee: Societe de Developpement et Recherches en Machinisme Agricole - Solerma, Istres, France

[21] Appl. No.: 722,803

[22] Filed: Apr. 12, 1985

[30] Foreign Application Priority Data

Apr. 13, 1984 [FR] France ................. 84 06020

[51] Int. Cl.⁴ ............................................. A01C 5/00
[52] U.S. Cl. ..................................................... 111/51
[58] Field of Search ....................................... 111/8-13, 111/15, 34, 36, 49, 51, 52, 59, 73, 80, 85, 1; 222/349, 350

[56] References Cited

U.S. PATENT DOCUMENTS

| 151,652 | 6/1874 | Conklin | 111/10 |
| 451,761 | 5/1891 | Howland | 111/51 |
| 841,982 | 1/1907 | Jordan et al. | 111/73 |
| 1,751,486 | 3/1930 | Lutz | 111/34 |
| 2,326,005 | 8/1943 | Bradley | 222/350 X |
| 2,483,204 | 9/1949 | Johnson et al. | 111/85 X |
| 2,808,181 | 10/1957 | Oehler | 111/34 |
| 2,871,805 | 2/1959 | Behnen | 111/77 |
| 3,335,680 | 8/1967 | Bauman et al. | 111/51 |
| 3,810,434 | 5/1974 | van der Lely et al. | 111/10 |
| 4,241,674 | 12/1980 | Mellinger | 111/59 |

FOREIGN PATENT DOCUMENTS

| 54130 | 11/1890 | Fed. Rep. of Germany . |
| 447097 | 6/1927 | Fed. Rep. of Germany . |
| 533688 | 3/1922 | France . |
| 237896 | 7/1925 | France . |
| 67063 | 11/1957 | France . |
| 2273462 | 1/1976 | France . |
| 2543789 | 10/1984 | France ................. 111/77 |
| 1332 | of 1861 | United Kingdom ........ 111/51 |

Primary Examiner—James R. Feyrer
Attorney, Agent, or Firm—Balogh, Kramer, Dvorak, Genova & Traub

[57] ABSTRACT

The object of the invention is a planter, especially for rice, which has a chassis that has a hopper which contains the seeds and which is equipped with nipples each one of which is equipped with a rotating distributor-dispenser and a spout; said chassis has a row of cellular drums and each drum has, in front, a fixed housing in the shape of a circular sector which has a crown which covers the periphery of the drum and a hub which is supported by bearings mounted on an axial extension of the hub of the cellular drum.

4 Claims, 8 Drawing Figures

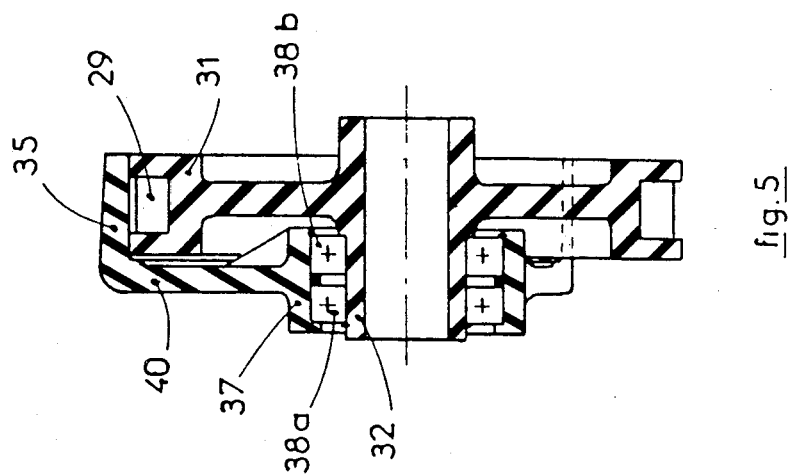
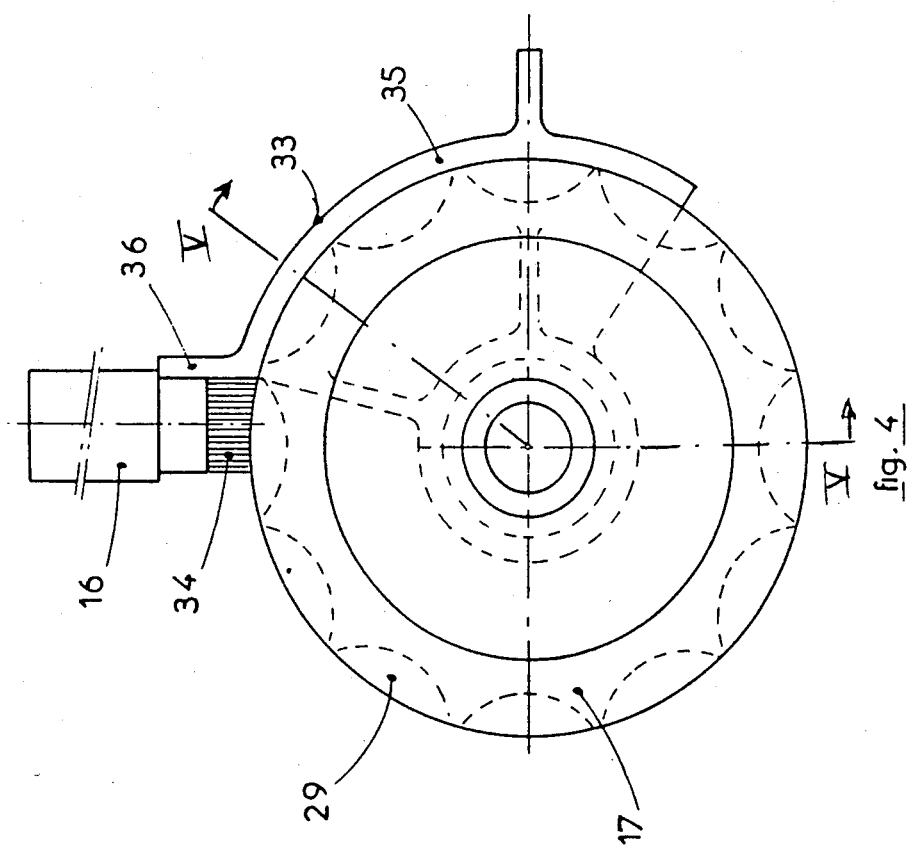

DROP PLANTER

The object of this invention is a drop planter.

The technical area of this invention is that of manufacture of agricultural machinery.

Automatic planters harnessed behind a tractor, distributing such seeds as wheat, rice, soybeans, etc., in small piles called heaps are not new.

To obtain good harvesting yields, it is necessary that each heap have a specific number of seeds and that the spacing between heaps be equally specific, regardless of the planter's speed of forward movement.

In the cultivation of rice, the drop planters are specially advantageous as they eliminate the traditional transplanting method which is a very tedious job requiring a lot of labor.

Drop planters, as is known, consist of a tractor-drawn chassis supported by an axle mounted on two wheels. This chassis supports a transversal hopper equipped with several dispensing nipples or several juxtaposed hoppers, which contain the seeds. Each hopper nipple is equipped with a revolving distributor-measurer which allows the instantaneous delivery of seeds, which is a function of the speed of the rotating motion.

The planter has a transversal shaft located near the ground and has a row of cellular distributing drums which rotate. Each drum is placed beneath a distributor-dispenser and the cells which successively pass under it receive a quantity of seeds which depends on the speed of rotation of the drums. Each cell receives the seeds once it is near the drum's top source and allows a pile of seeds to fall on the ground once it is turned at least 90° and at most 180°.

One of the problems to be resolved is keeping the seeds in the cells during the rotation of the distributing drums.

The previous patent FR. 81/18.171 (FELLER Marc) described a tractor drawn planter in which each cell of the distributing drums is equipped with a jointed valve which keeps the seeds in the cell until it is activated by a stationary cam.

A previous patent FR. 74/20.628 described a planter equipped with endless belts each covering a part of each distributing drum's periphery and which are driven by the distributing drum, in such a way that each belt moves with a speed equal to the peripheral speed of the distributing drum driving it.

The existing devices for temporarily keeping the seeds in the distributing drums' cells are not totally satisfactory, either because they are complex and fragile or because they crush part of the seeds.

One objective of this invention is to provide hill planters with new devices to keep the seeds in the distributing drum's cells, which are stronger devices and which prevent as much as possible the seeds from going into the distributing drum is periphery and the cells' closing devices.

Drop planters are currently used to sow rice because they eliminate transplanting in water.

In this application, it is necessary that the soil on which the piles of grains of rice are deposited be well leveled so that the water is uniformly distributed in the rice field. It is likewise necessary that the grains of rice be deposited on the soil surface, without being buried, as it is under these conditions that the best germination is obtained, in temperate climates.

Drop planters equipped with a second transversal hopper containing a weeding agent which is automatically distributed at the same time as the seeds are already known.

Another objective of this invention is to provide a drop planter capable of distributing a herbicide in front of the seeds and which has the capacity to mix the herbicide with the cutivation soil and the capacity to level the soil before putting down the seed heaps.

The objective of the invention is a drop planter of the known type having a chassis harnessed behind a tractor; the chassis is supported by an axle mounted on two wheels and which supports a transversal hopper which contains the seeds; the hopper has a row of nipples each of which is equipped with a revolving distributor-dispenser and said planter has, besides, a transverse row of cellular drums which are placed beneath said distributor-dispensers and are keyed on a transversal drive shaft.

The objectives of the invention are obtained by a planter which has, attached to each cellular drum, a fixed housing, in the form of a circular sector, which covers part of the periphery of said cellular drum with very little clearance.

Each fixed housing is placed in the front part of the cellular drum and covers a sector of it comprising between 90° and 180° and, preferably, on the order of 110° to 130°.

In a preferred manner of realization, each housing has a crown which covers a part of the periphery of a cellular drum which is connected by a radial spider to a hub which is mounted on bearings which are engaged on an extension of the hub of said cellular drum, in such a way that said crown is centered on the said cellular drum with very little clearance.

The invention results in new drop planters.

Compared to the known planters which have a valve in each cell of the cellular drums, the planter embodying this invention has the advantage of simpler mechanical construction, is stronger and less costly.

The preferred manner of realization including hoppers which distribute the phytosanitary products, together with claws which mix the herbicide in the soil, and a roller behind the claws which rolls over the soil in order to level it, removing the hollows left by the claws, is especially suited for automatically planting the grains of rice in heaps, as it allows depositing them on level soil and obtaining uniform distribution of water in the rice field.

The following descriptions make reference to the attached drawings which represent, without being exhaustive in nature, one example of the realization of a planter embodying the invention.

FIG. 4 is a side view of a fixed housing mounted around a cellular drum.

FIG. 5 is a cross-section along V—V in FIG. 4.

Figure 1:
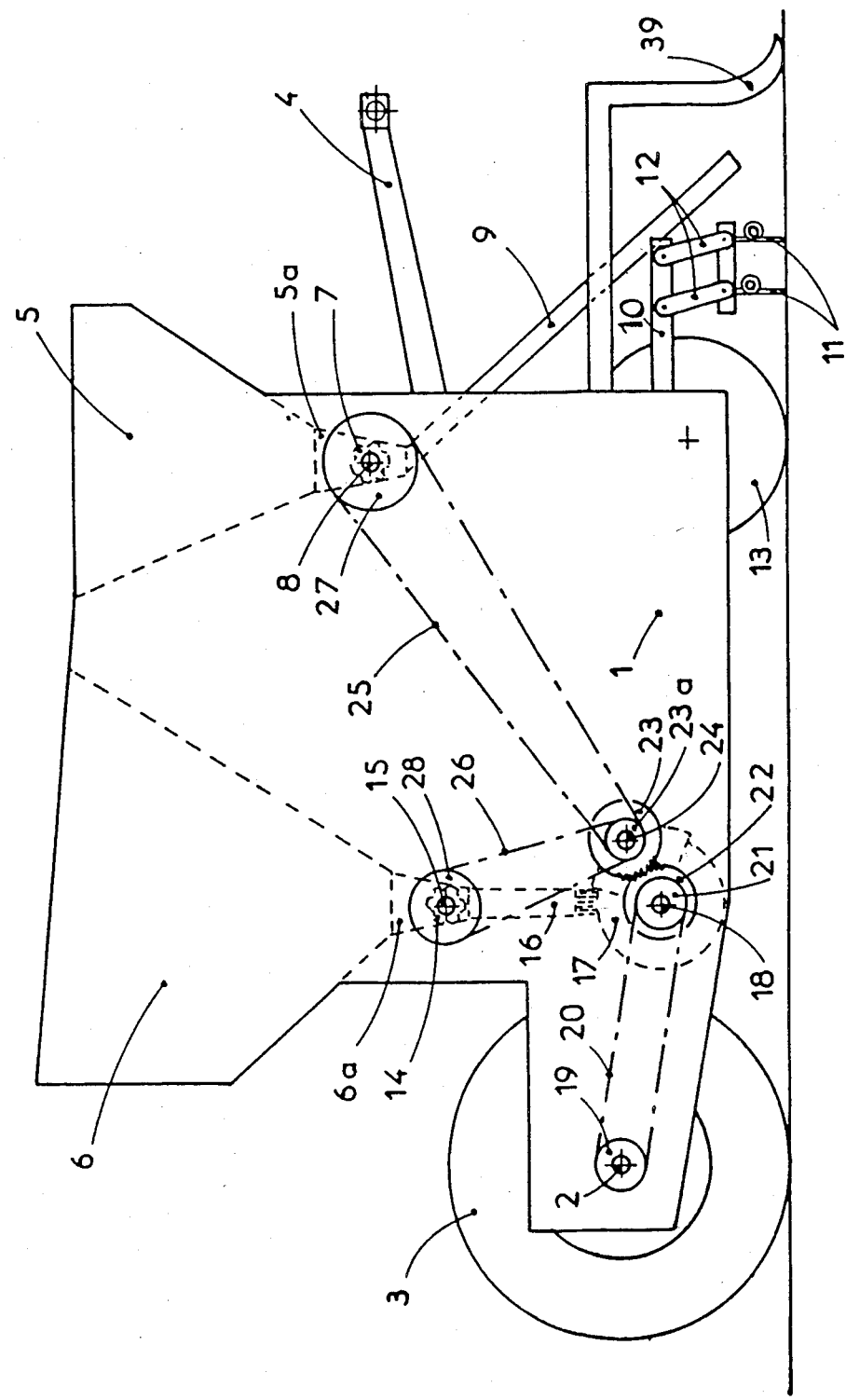
FIG. 1 is a side view of a drop planter according to the invention.

FIG. 1 represents a drop planter that has a chassis 1 supported by an axle 2, mounted on two wheels 3, located at the back of the machine.

Chassis 1 is hitched behind a tractor with a coupling 4. Chasis 1 has two transversal hoppers, one front hopper 5 which contains the phytosanitary products, and one rear hopper 6 which contains the seeds, grains of rice, for example.

The front hopper has, in its lower part, a row of nipples 5a and each one of these nipples is equipped with a distributor-dispenser, of a known type, having a grooved drum 7.

All the drums 7 are keyed on a transversal shaft 8 which makes them rotate. The phytosanitary products come out of distributor-dispensers 8 at a rate determined by the drums' rotating speed. They fall to the ground by gravity through spouts 9 which are inclined towards the front and the lower ends of which are close to the soil in the manner of a paddle which distributes the products widthwise.

Chassis 1 has, in front, bars 10 pointed towards the front and each one of these bars has claws 11 formed of steel rods. The claws 11 are attached to the bars 10 by jointed parallelograms 12 formed by two connecting rods. As the planter moves forward, the claws 11 penetrate the soil and the parallelogram drops down to the rear and the claws 11 are located immediately behind the lower end of the spouts 9, and claw the soil by their weight, so that they mix the phytosanitary products with the soil.

The planter has, also, in front, two symmetrical ploughshares 39 placed in alignment with the tractor wheels, to turn up the earth and remove the ruts made by the wheels.

The planter has, in front, a roller 13, which is located behind the claws 11. The roller 13 rolls over the soil and flattens it after passage of the claws, so that the seeds are deposited on a well leveled soil which is particularly important for the sowing of the grains of rice in heaps.

Hopper 6 also has at its lower end a row of nipples 6a uniformly distributed with spacing that corresponds to the transversal spacing between the rows of heaps.

Advantageously, nipples 6a and nipples 5a have the same longitudinal alignmenent. Each nipple 6a is equipped with a known distributor-dispenser which has a grooved drum 14. All the drums 14 are keyed on the same transversal shaft 15 and the delivery of the distributor-dispensers relies on the drive speed of the shaft 15. The seeds leaving each distributor-dispenser 15 drop by gravity through a spout 16 which brings them to the periphery of a cellular drum 17. All the cellular drums are keyed on a transversal shaft 18.

FIG. 1 shows the device which drives the three shafts 8, 15 and 18 starting with the movement of the wheels 3.

A toothed wheel 19 is mounted on axle 2 and an endless chain 20 transmits the movement of the wheels to a toothed wheel 21, which is keyed on shaft 18. The movement of shaft 18 is transmitted by the pinions 22, 23, to an axle 24, on which the toothed wheels 23a are mounted, on which the endless chains 25, 26 pass transmitting the movement of axle 24 to the toothed wheels 27, 28 keyed respectively on shafts 8 and 15.

It may be seen that the cellular drums 17 are driven at a speed proportional to the planter's forward speed, so that the longitudinal spacing between heaps remains constant. Shaft 15, on which distributor-dispensers 14 are mounted, is likewise driven at a speed proportional to the planter's forward speed, so that the delivery of seeds increases as the planter picks up speed, but since the speed of rotation of the cellular drums increases by an equal amount, the number of seeds deposited in each cell remains constant.

The delivery of distributor-dispenser 7 increases by an equal amount as the planter's speed increases, so that the quantity of the phytosanitary products distributed per unit of length remains constant.

Figure 3:
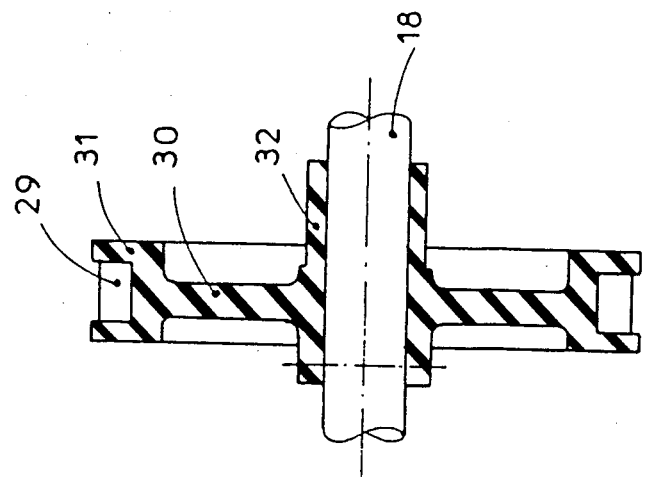
FIGS. 2 and 3 are side and cross-section views of a cellular drum.
Figure 2:
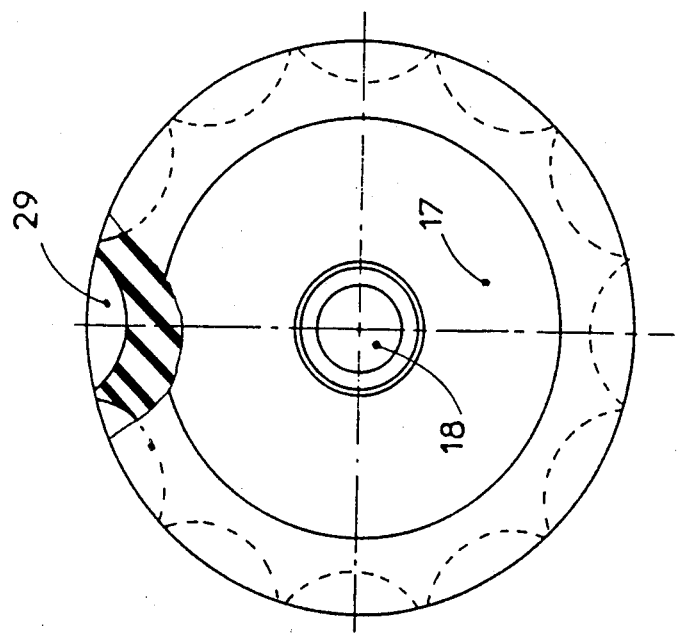

FIGS. 2 and 3 show a side view and a cross-section on a larger scale of one of the cellular drums 17, mounted on the shaft 18.

It may be seen from these figures that the drum 17 has, on its periphery, a number of cells 29, for example, twelve evenly distributed cells, in the form of portions of circular-contoured cylinders whose depths are less than the radius of the cylinder and, for example, are on the order of half the radius.

It may also be seen that each cellular drum has a spider 30 which supports a peripheral ring 31, in which the cells 29 are hollowed out and has a hub 32 which is engaged and keyed on shaft 18 and this hub has a longer length than the length of the peripheral ring 31, so that it extends on shaft 18, beyond the cellular drum.

FIG. 4 shows a right side view of a cellular drum 17 and of a fixed housing 33 mounted on part of its periphery.

FIG. 5 is a disconnected cross-section passing through line V—V of FIG. 4.

In FIG. 4 a spout 16 coming from a distributor-dispenser 14 is shown. The lower end of this spout is equipped with a brush 34 formed by flexible weights, which rub the periphery of the alveolar drum 17 and delimit a course through which the seeds coming from spout 16 flow into the cells 29.

The fixed housing 33 has a crown 35 which covers a part of the periphery of the cellular drum with very little, so that it is impossible for a seed to lodge itself between the two.

The upper end of the crown 35 is joined to the brush 34 and it has a vertical extension 36 which is attached to the front side of the brush. The crown 35 extends over a circular sector having an angular opening of between 90° and 180° and, preferably, on the order of 110° to 130°, so that it prevents the seeds from leaving the cells as they pass under the crown, so that the seeds contained in a cell fall out in piles outside it once the cell emerges from the lower part of the fixed sector. The crown 35 is attached by a radial spider 40 to a hub 37 which rests on two bearings 38a, 38b which are engaged on the extension 32 of the hub of the cellular drum as seen in FIG. 5. Thus each fixed sector 33 is perfectly centered in relation to the cellular drum it covers, which permits a construction with very little clearance.

Figure 6:
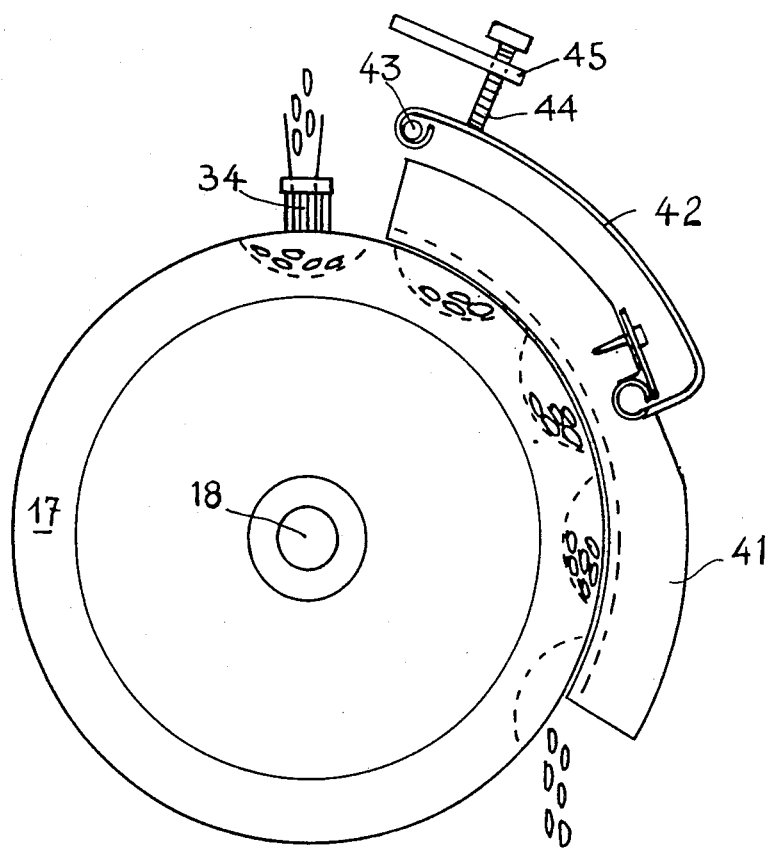
FIG. 6 is a side view of another manner of realization which has a wooden shoe applied against each cellular drum.

FIG. 6 shows a side view of another manner of realization. In this figure one finds again a cellular drum 17, mounted on shaft 18 and also the brush 34. In this example, the fixed housing consists of a shoe 41, made of wood or any other material, in the shape of an arc of a circle which covers a part of the periphery of the cellular drum. The inside face of the shoe may be covered with a coat of a material that would improve sliding. Each shoe is fixed on a spring plate 42 and all the plates are mounted on a transversal rod 43, fixed to the chassis.

Each spring plate is prestressed by a screw 44 which is screwed into a plate 45 which is joined to the chassis. By turning screw 44, the pressure of the shoe against the drum is regulated. This manner of realization is sturdier and less costly than the previous one.

Figure 7:
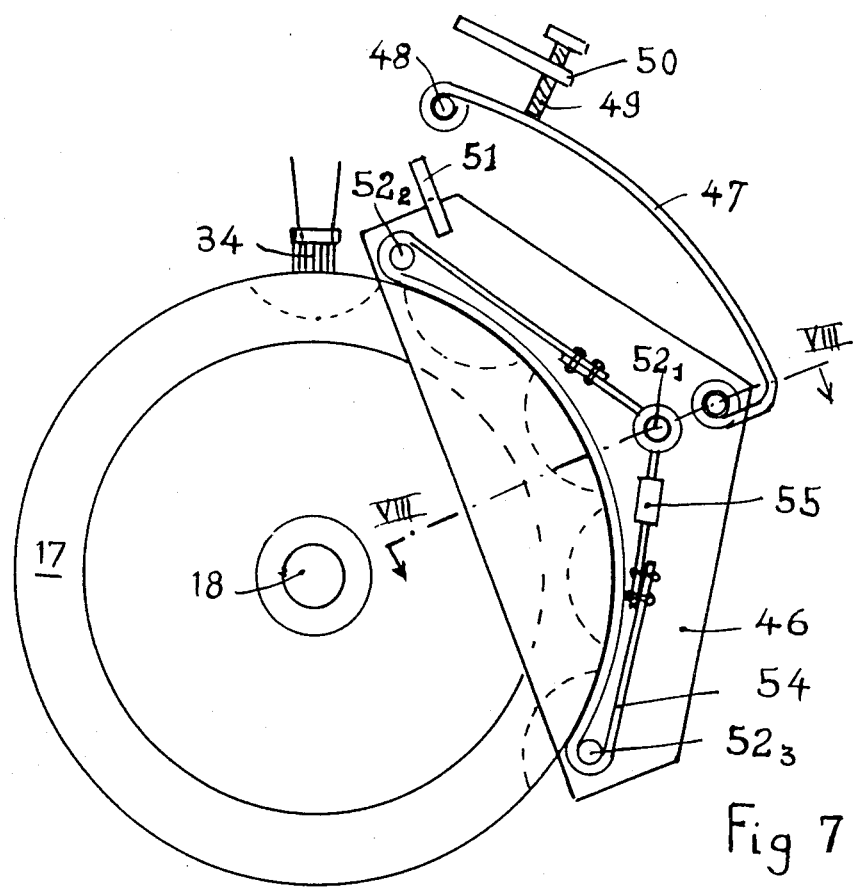
FIG. 7 is a side view of another manner of realization mode which has a housing consisting of a strap.
Figure 8:
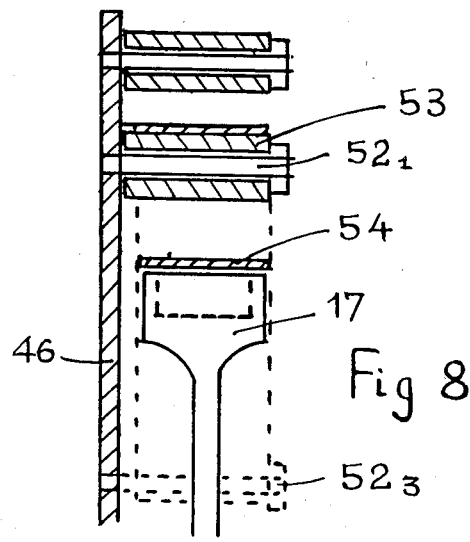
FIG. 8 is a cross-section along VIII—VIII in FIG. 7.

FIGS. 7 and 8 show a side view and a partial cross-section of a third manner of realization of a fixed housing in the shape of a circular sector which covers a part of the periphery of the drum. In this figure there is again a cellular drum 17 mounted on the shaft 18 and a brush 34. In this example, each fixed housing has a stiff plate 46 which is parallel to the spider of a drum 17. This plate is supported by a spring plate 47 which is fixed on a transversal rod 48. As before, a screw 49 screwed into a plate 50 allows the regulation of the spring's prestress. Each plate 46 is held in place by a fork 51 which ensures the parallel alignment of the plate. The forks 51, the rod 48 and the plates 50 are attached to the chassis.

Each plate has three pins $52_1$, $52_2$, $52_3$ triangularly arranged on which the pivoting rollers 53 are mounted.

An endless belt 54 passes over the three rollers 53 and this belt is attached to a part of the periphery of the cellular drum 17, so that it seals the cells. The width of the belt is equal to or slightly greater than the width of the drum 17. The belt 54 has a turnbuckle 55 of the stretch type.

The cellular drums 17 must be keyed on the shaft 18 with an angular interval between drums equal to half the centerline distance between two successive cells 29, so that the hills are deposited in a quincunx.

I claim:

1. An accumulator hill drop planter having a chassis, the chassis having a front portion including means for coupling the chassis to a prime mover, the chassis having a rear portion, the rear portion having an axle bearing two ground support wheels, the chassis mounting an elongated seed hopper, the seed hopper having a row of downward hopper nipples, each nipple equipped with a rotating dispenser, said planter further including a transverse row of cellular drums, each of said cellular drums comprising peripheral cells for receiving the seeds falling from one of said rotating dispensers and having a drum hub, said drum hub being wider than said drum, a transverse drive shaft, each said drum hub being keyed on said transverse drive shaft, each cellular drum being fitted with a housing having a circular sector placed in front of said cellular drum, said housing comprising a housing crown defining said circular sector, said housing crown covering a portion of the periphery of said cellular drum and being so spaced from said cellular drum as to confine seeds within said peripheral cells, a housing hub, the housing hub being mounted on bearings, said bearings engaging said drum hub, and spider means connecting said housing crown to said housing hub to fix the spacing of said housing crown relative to the periphery of said cellular drum.

2. The planter according to claim 1, in which the shape of the peripheral cells is defined as a portion of a cylinder having a circular transverse section, the axis of said cylinder being parallel to the axis of said cellular drum, the depth of said portions within the cellular drum being less than the radius of said cylinders.

3. The planter according to claim 1, wherein each housing crown extends from the top of each drum over a circular sector having an angular extent of from 110° to 130° over the periphery of the cellular drum periphery relative to the axis of the cellular drum.

4. The planter according to claim 1, further comprising a second transverse hopper, said second transverse hopper being placed in the forward portion of the chassis, said second transverse hopper adapted to contain phytosanitary products and being equipped with spouts, said spouts each having a lower end, each said lower end being located above the soil surface, said planter further comprising claws, means mounting said claws behind said spouts, and a transverse roller, means mounting said transverse roller between said claws and said cellular drum.

* * * * *